(12) United States Patent
Bellussi et al.

(10) Patent No.: US 11,794,907 B2
(45) Date of Patent: Oct. 24, 2023

(54) BLADE FOR A HOVER-CAPABLE AIRCRAFT AND METHOD FOR REMOVING ICE FROM SAID BLADE

(71) Applicant: LEONARDO S.P.A., Rome (IT)

(72) Inventors: Enrico Bellussi, Samarate (IT); Michele Arra, Samarate (IT); Francesco De Domenico, Samarate (IT)

(73) Assignee: LEONARDO S.P.A., Rome (IT)

( * ) Notice: Subject to any disclaimer, the term of this patent is extended or adjusted under 35 U.S.C. 154(b) by 275 days.

(21) Appl. No.: 17/286,158

(22) PCT Filed: Sep. 30, 2019

(86) PCT No.: PCT/IB2019/058294
§ 371 (c)(1),
(2) Date: Apr. 16, 2021

(87) PCT Pub. No.: WO2020/084365
PCT Pub. Date: Apr. 30, 2020

(65) Prior Publication Data
US 2021/0387738 A1    Dec. 16, 2021

(30) Foreign Application Priority Data
Oct. 26, 2018  (EP) ..................................... 18202975

(51) Int. Cl.
*B64D 15/16* (2006.01)
*B64C 27/473* (2006.01)
*B64D 15/12* (2006.01)

(52) U.S. Cl.
CPC .......... *B64D 15/163* (2013.01); *B64C 27/473* (2013.01); *B64D 15/12* (2013.01)

(58) Field of Classification Search
None
See application file for complete search history.

(56) References Cited

U.S. PATENT DOCUMENTS 5,558,304 A * 9/1996 Adams .................... B64D 15/00
  244/134 A
5,686,003 A * 11/1997 Ingram .................. B64D 15/12
  219/528

FOREIGN PATENT DOCUMENTS

| DE | 19922153 A1 * | 11/2000 | ............. B64C 27/50 |
| GB | 2472053 A * | 1/2011 | ........... B64D 15/163 |
| WO | WO 98/24690 | 6/1998 | |

OTHER PUBLICATIONS

ASTM B209/B209M-21a, Jan. 12, 2022, ASTM International, p. 32-33 (Year: 2022).*

(Continued)

*Primary Examiner* — Joshua J Michener
*Assistant Examiner* — Michael B. Kreiner
(74) *Attorney, Agent, or Firm* — Leason Ellis LLP (57) ABSTRACT

A blade for a rotor of a hover-capable aircraft is described comprising: a main body with a first outer surface; and a de-icing system for removing ice; the de-icing system, in turn, comprises: a first layer formed by a shape-memory material activatable so as to alter its shape according to a temperature-associable quantity, which is arranged on at least one outer surface of the main body; the de-icing system is characterized in that it comprises a second covering layer, which defines at least a portion of a second outer surface of the blade on which ice deposits; the second layer laid on top of the first layer on the opposite side of the main body is selectively movable under the action of the first layer so as to exert a mechanical action on the ice and remove it from the blade, and is adapted to protect the first layer from external agents.

17 Claims, 5 Drawing Sheets

(56) References Cited

OTHER PUBLICATIONS

ASTM E8/E8M-22, Jul. 19, 2022, ASTM International, p. 1 (Year: 2022).*

* cited by examiner

BLADE FOR A HOVER-CAPABLE AIRCRAFT AND METHOD FOR REMOVING ICE FROM SAID BLADE

CROSS-REFERENCE TO RELATED APPLICATIONS

This patent application is a U.S. National Phase Application under 35 U.S.C. § 371 of International Patent Application No. PCT/IB2019/058294, filed on Sep. 30, 2019, which claims priority from European Patent Application No. 18202975.1, filed on Oct. 26, 2018, all of which are incorporated by reference, as if expressly set forth in their respective entireties herein.

TECHNICAL FIELD

The present invention relates to a blade for a hover-capable aircraft, in particular a convertiplane or helicopter.

The present invention also relates to a method for removing ice from a blade for a hover-capable aircraft, in particular a convertiplane or helicopter.

BACKGROUND ART

It is known that the formation of ice on the wing and/or control surfaces of helicopter blades can worsen the aerodynamic characteristics of helicopters and, in some cases, make controlling them particularly difficult.

In general, ice forms on the blades of helicopters when the latter are in flight or stationary on the ground with the blades rotating.

More specifically, ice tends to form on the leading edges of the blades when the latter are at temperatures close to or below zero degrees centigrade.

In order to reduce the risks deriving from ice forming on the leading edges of the blades, it is known to use anti-icing systems or de-icing systems on helicopters.

An example of de-icing systems for the tip portion of an aircraft blade is known from U.S. Pat. No. 5,686,003. In greater detail, the de-icing system shown in U.S. Pat. No. 5,686,003 basically comprises, at a leading edge of the aforementioned tip portion of the blade:

a layer of shape-memory material;
a polymer layer applied on the leading edge of the blade; and
a heat generation layer, interposed between the layer of shape-memory material and the polymer layer.

The layer of shape-memory material defines a portion of the outer surface of the blade.

The shape-memory material is able to alter its shape and create a force through martensitic phase transformation when exposed to an energy source, such as, for example, heat.

In the event of ice being detected, the heat generation layer is activated and the shape-memory material expands so as to exert a force on the ice and break this ice on the outer surface of the blade.

The heat necessary for thermal activation of the shape-memory layer is supplied by a layer containing electric resistances or by latent heat of fusion produced by liquid-solid phase transformation.

There is awareness in the industry of the need to reduce the risk of atmospheric agents or particles in the air damaging the layer of shape-memory material, thereby rendering the de-icing system unusable and insecure for helicopter flight safety.

This risk is exacerbated due to the fact that the blades have tangential velocities close to the speed of sound at their respective free ends. These particularly high tangential velocities can accelerate the aforementioned particles, making impact with the shape-memory layer even more violent.

This risk is particularly high when the helicopter is hovering at low altitude or on the ground with the rotor in operation, as the rotation of the blades tends to entrain residues and dust in rotation.

WO-A-98/24690 discloses a three-dimensional active composite membrane, formed of two layers of polymer and a reinforcement wire net therebetween, actuated to assume selected different three-dimensional patterns (shapes) by an external Shape Memory Alloy wire net or by other types of mechanical actuators to which it is attached. More particularly, the composite membrane comprises two elastic outer layers and a reinforcement member extending therebetween. The edges of the reinforcement member are attached through one of the outer layers to edges of an outer Shape Memory Alloy actuating net which has an area similar to that of said reinforcement member and smaller than that of said outer layers. The actuating net is driven to contraction or extension by direct heat thereby causing a normal deflection of the reinforcement member and thus of said outer layers.

U.S. Pat. No. 5,558,304 discloses an apparatus for deicing an outer shell includes an element comprised of shaped memory metal which undergoes a transformation from a weaker low temperature form (Martensite) to a stronger, high temperature form (Austenite) when the element is heated through its transformation temperature. The change in shape is utilized to deflect the outer shell to thereby shed ice accumulated thereon.

DISCLOSURE OF INVENTION

The object of the present invention is to produce a blade for a hover-capable aircraft according to claim 1.

The present invention also relates to a method for removing ice from a blade of a rotor of an aircraft according to claim 13.

BRIEF DESCRIPTION OF THE DRAWINGS

For a better understanding of the present invention, a preferred embodiment is described hereinafter, by way of non-limitative example and with reference to the accompanying drawings, in which.

BEST MODE FOR CARRYING OUT THE INVENTION

Figures 1, 1A, 2:
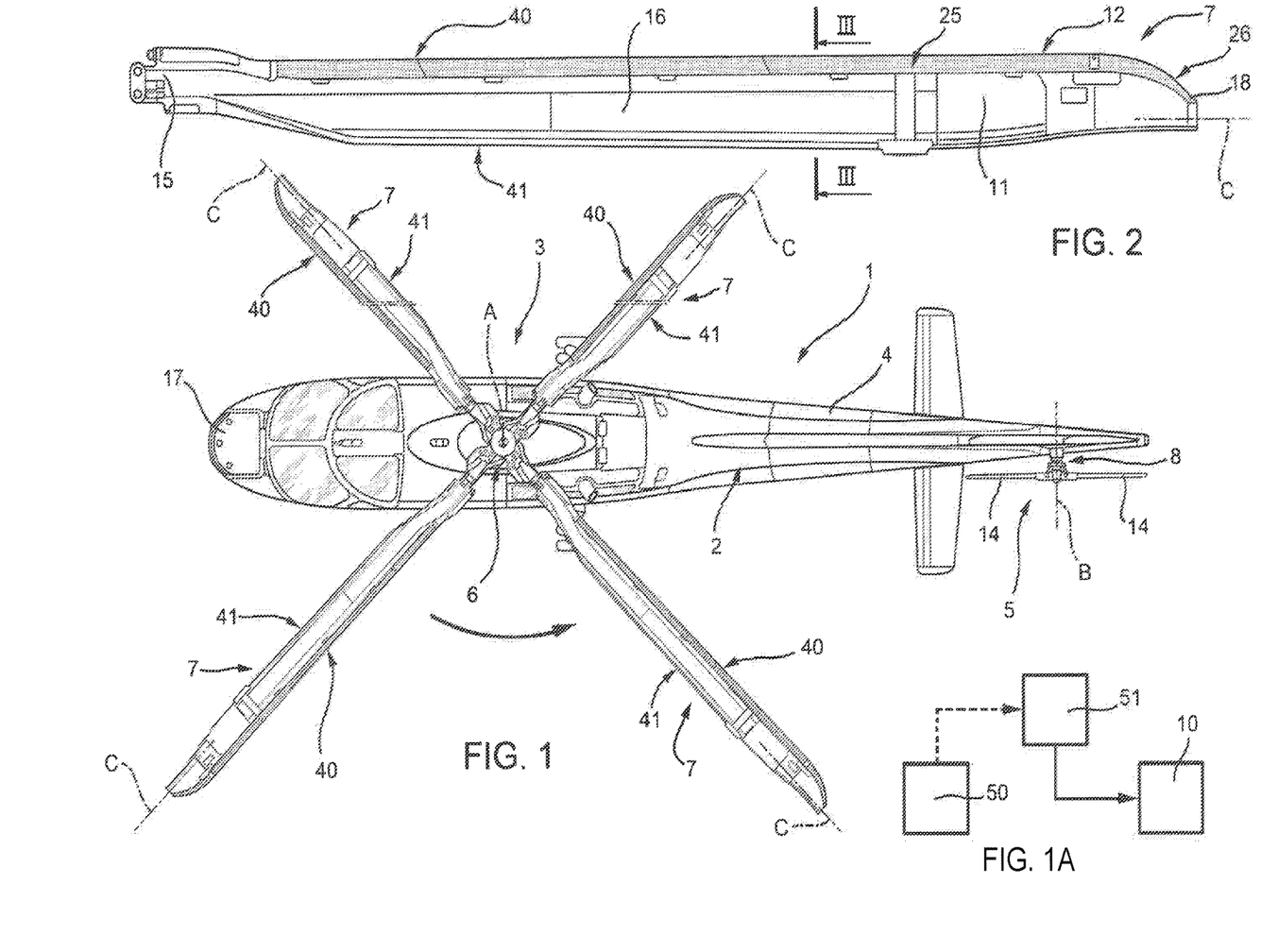
FIG. 1 shows a top view of an aircraft, in particular a helicopter, comprising a rotor with a plurality of blades made according to the present invention.
FIG. 1A is a schematic diagram showing components of the aircraft of FIG. 1.
FIG. 2 is a top view, on a highly enlarged scale, of a blade made according to the invention and incorporated in the rotor of FIG. 1.

Referring to FIG. 1, the reference numeral 1 indicates an aircraft, in particular a hover-capable aircraft, which in the case shown is a helicopter.

The helicopter 1 basically comprises a fuselage 2, a main rotor 3 arranged on the top of the fuselage 2, and a tail rotor 5.

The fuselage 2 comprises, at opposite ends, a nose 17 and a tail boom 4 supporting the tail rotor 5.

The main rotor 3, in turn, comprises:
a hub 6 rotatable about an axis A; and
a plurality of blades 7 extending from the hub 6 and hinged on the hub 6.

Similarly, the tail rotor 5, in turn, comprises a hub 8 rotatable about an axis B transversal to axis A and a plurality of blades 14 extending from the hub 8 and hinged on the hub 8.

Referring to FIG. 2, each blade 7 extends along a relative axis C transversal to axis A.

Each blade 7, in turn, comprises:
a main body 11 delimited by a surface 9;
an outer surface 12; and
a de-icing system 10 for removing ice 13 deposited on the surface 12.

Each blade 7 further comprises, proceeding from the hub 6 in a direction radial to axis A and opposite to the axis A:
a root portion 15 hinged on the hub 6;
a main portion 16; and
an end portion defining an end 18.

Each blade 7 further comprises:
a leading edge 40;
a trailing edge 41 (only visible in FIGS. 1 and 2);
a top surface 42 and an underside 43, opposite to each other and extending between the leading edge 40 and the trailing edge 41.

In particular, following the rotation of the blade 7, the leading edge 40 strikes the air before the trailing edge 41 of the same blade 7.

The helicopter 1 also comprises a plurality of systems 10 associated with respective blades 7 of the rotor 3.

Hereinafter in the present description, an individual system 10 and a relative individual blade 7 are described, as the systems 10 and the blades 7 are identical to one another.

In greater detail, the de-icing system 10, in turn, comprises:
a layer 20 of a shape-memory material activatable so as to alter its shape according to the temperature; and
an activation layer 21, which is adapted to be selectively activatable to generate the amount of heat necessary to activate the layer 20.

Figure 3:
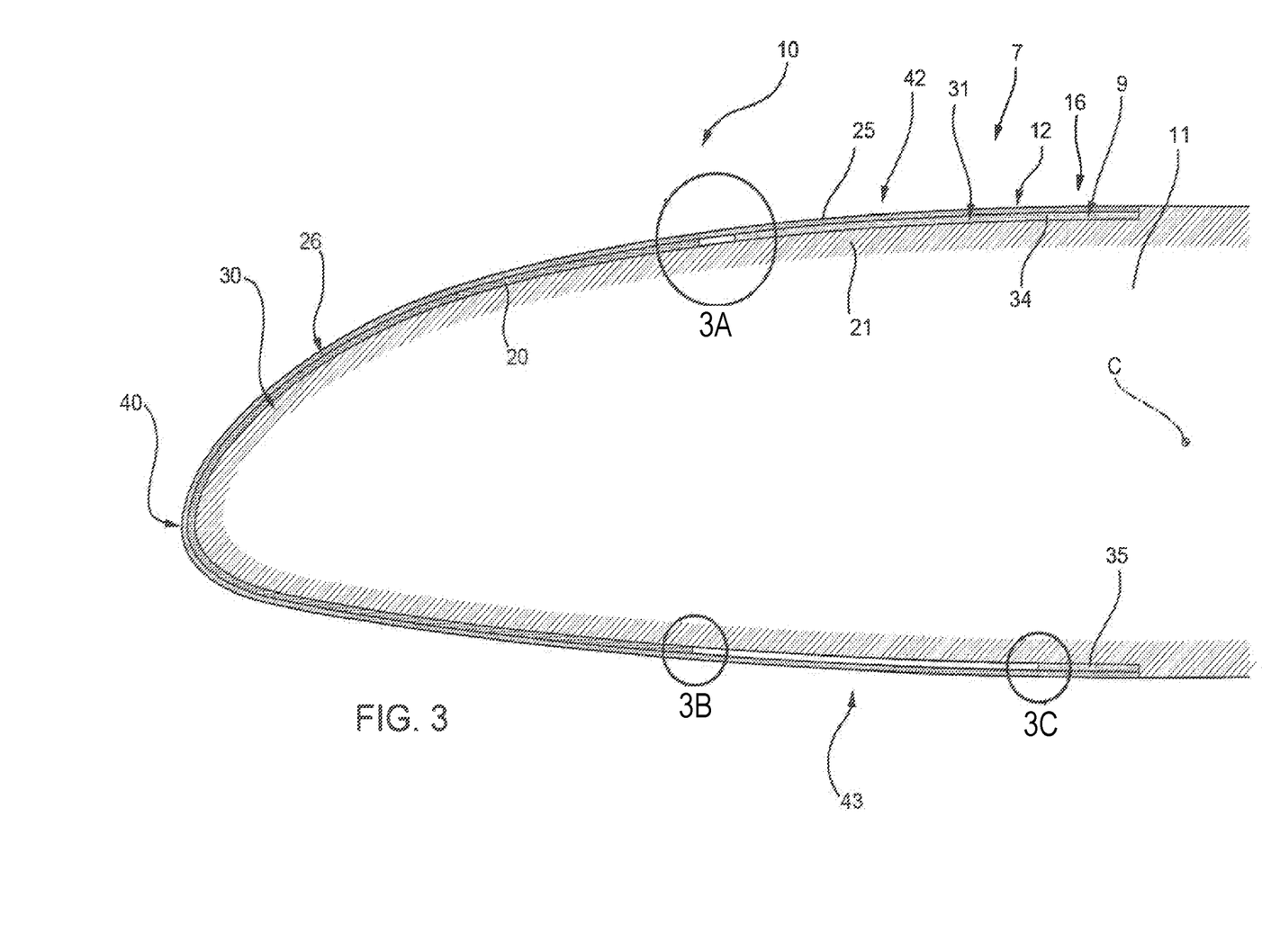
FIG. 3 is a section, on a highly enlarged scale, along line III-III of FIG. 2.

The layer 20 is applied on surface 9 of the body 11.

The material forming layer 20 assumes a first undeformed configuration (FIGS. 3 and 4) when it is below a temperature threshold value, and assumes a second deformed configuration (FIG. 5) when it is above the aforementioned threshold value.

When arranged in the undeformed configuration (FIGS. 3 and 4), the layer 20 assumes the same shape as surface 9 of the body 11 and, therefore, exerts substantially no action on the ice 13.

Figures 4, 5:
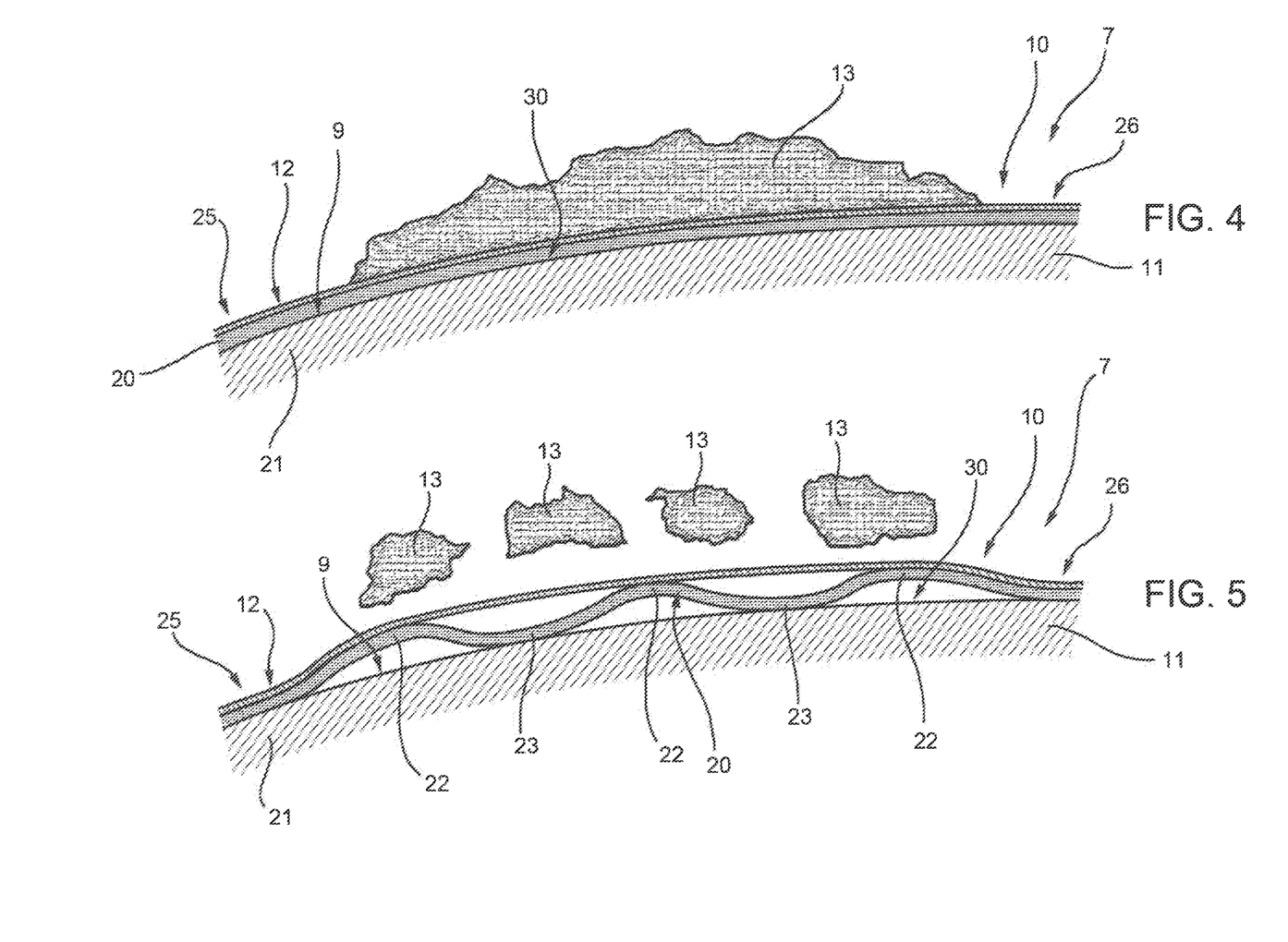
FIG. 4 shows, on a highly enlarged scale, some details of the blade of FIGS. 2 and 3 in a first operating configuration, with parts removed for the sake of clarity.
FIG. 5 shows, on a highly enlarged scale, details of the blade of FIG. 4 in a second operating configuration, with parts removed for the sake of clarity.

Contrariwise, when arranged in the deformed configuration (FIG. 5), the layer 20 assumes an undulated configuration formed by an alternated plurality of crests 22 and troughs 23. The crests 22 are spaced apart from the surface 9 and protrude towards surface 12. The crests 22 exert an action on the ice 13, causing its fragmentation, as shown in FIG. 5. The troughs 23 adhere to the surface 9.

Layer 21 is embedded in the body 11 in a position adjacent to the layer 20, so that the heat it generates raises the temperature of the layer 20 and activates it.

In the case shown, the layer 21 is formed by electric resistances (only schematically shown in FIGS. 3 to 5) powered by an electric generator arranged onboard the hub 6 or on a fixed part of the helicopter 1.

The de-icing system 10 comprises a covering layer 25, which defines a portion 26 of the surface 12 of the blade 7 on which the ice 13 deposits;

Layer 25 is laid on top of the layer 20 on the opposite side of the body 11, is selectively movable under the action of the layer 20 so as to exert a mechanical action on the ice 13 and remove it from the blade 7 (FIG. 5), and is adapted to protect layer 20 from external agents.

In greater detail, layer 25 is movable between:
a first position (FIG. 5) assumed when the layer 20 is activated and is in the deformed configuration; and
a second position (FIG. 4) assumed when the layer 20 is deactivated and is in the undeformed configuration.

Layer 25 substantially adheres to the layer 20 for its entire extension in the second position shown in FIG. 4.

Conversely, layer 25 adheres to the crests 22 and, therefore, is spaced apart from surface 9 of the body 11 in the first position shown in FIG. 5.

Preferably, layer 25 elastically moves between the aforementioned first and second configurations.

Layer 25 is made of a material endowing it with at least the following characteristics:
sufficient rigidity to resist the impacts against external agents, for example sand or dust at the tangential velocity of the blades 7, and with particular reference to a low-altitude, close-to-ground flight condition of the helicopter 1; and
sufficient flexibility to elastically move between the aforementioned first and second positions, following the movements of the layer 20 between the respective undeformed and deformed configurations.

More specifically, layer 25 is made of a super-plastic material.

The material of the layer 25 has a maximum elastic deformation of 0.5%. In other words, the deformation of this material is 0.5% with respect to the initial length upon reaching the yield stress.

In particular, this maximum elastic deformation value of 0.5% is maintained within a temperature range between −40° C. and 70° C.

Furthermore, the material of layer 25 is able to maintain this maximum elastic deformation of 0.5% after a predetermined number of fatigue cycles, in particular at least a million cycles.

Layer 25 is made of a super-plastic material.

Particular examples of this super-plastic material are titanium alloys, other metal materials or non-metal materials that exhibit the aforementioned characteristics.

In the embodiment shown in FIG. 3, the layers 20, 21 and 25 are arranged on the leading edge 40.

The layers 20, 21 and 25 are also arranged on portions of the top surface 42 and the underside 43 of the blade 7 adjacent to the leading edge 40 and incident on the leading edge 40.

Referring to FIG. 2, layer 25 is arranged over the end 18 and the main portion 16 of the blade 7.

Contrariwise, layer 25 is not applied over the root portion 15.

Referring to FIGS. 3 to 5, layers 20 and 25 are applied directly on respective portions 30 and 31 of surface 9 of the body 11.

Portion 30 is arranged radially external with respect to portion 31 in relation to the rotation axis A of the hub 6 and the blades 7.

Portion 30 extends over the leading edge 40 of the blade 7 and regions of the top surface 42 and the underside 43 of the blade 7 incident with each other on the leading edge 40.

Portion 31 extends over the regions of the top surface 42 and the underside 43 of the blade 7 spaced out from the leading edge 40.

Layer 20 does not extend over portion 31 of the body 11.

In other words, layer 25 is applied directly on the body 11 of the blade 7 on portion 31 where layer 20 is not present.

In particular, layer 25 is applied directly on portion 31 of the body 11 by means of two glued areas 34 and 35, arranged respectively on the top surface 42 and on the underside 43 of the blade 7.

Figure 3A:
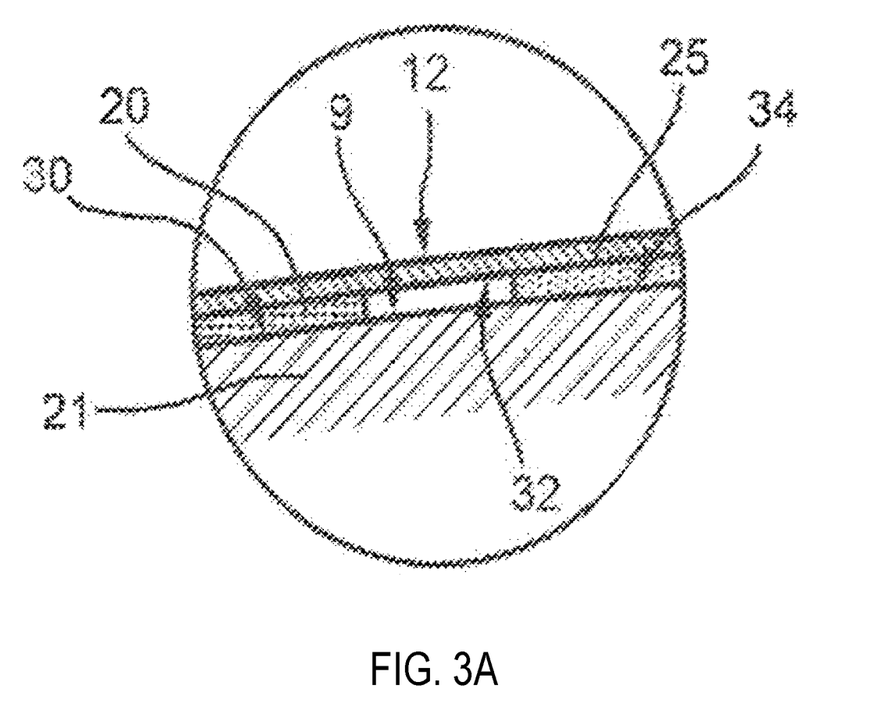
FIGS. 3A, 3B, and 3C are closeup views of areas marked "3A," "3B," and "3C," respectively in FIG. 3.
Figure 3B:
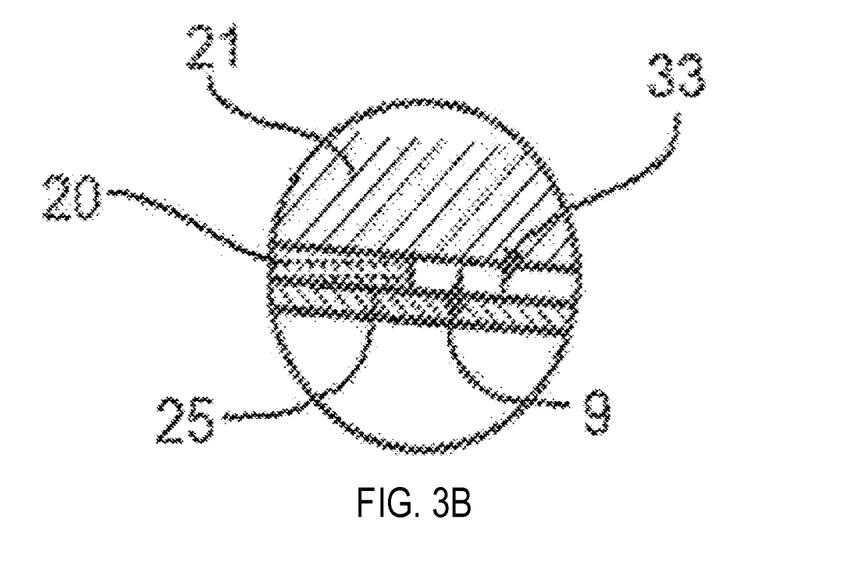
Figure 3C:
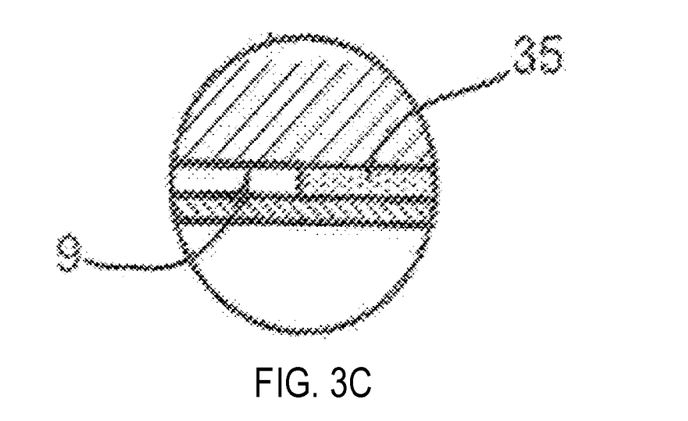

Layer 20 is separated from the glued areas 34 and 35 by respective grooves 32 (see FIG. 3A) and 33 (see FIGS. 3B and 3C), arranged on the top surface 42 and on the underside 43 of the blade 7.

The grooves 32 and 33 have an extension transversal to the axis C of the blade 7.

Groove 33 may have a longer extension than groove 32 if required by the constructional requirements of the blade.

The helicopter 1 also comprises:
one or more sensors 50 (only schematically shown in FIG. 1A) adapted to detect the presence of ice 13 on the blade 7; and
a control unit 51 (this also only schematically shown in FIG. 1A), which is functionally connected to the sensor 50 and layer 21 of the de-icing systems 10 of the blades 7.

In particular, when the sensor 50 detects the presence of ice 13 on the blades 7, the control unit 51 controls the passage of electric current inside the resistances of layers 21 of the respective blades 7, so as to cause the movement of the respective layers 20 from the respective undeformed configurations to the respective deformed configurations.

Operation of the helicopter 1 is described hereinafter starting from a condition in which layer 20 is in the deactivated configuration and, as a consequence, layer 25 is in the second position shown in FIG. 4.

Operation of the rotor 3 causes the rotation of the blades 7 about the axis A and relative to the hub 6.

During operation of the helicopter 1, ice 13 forms and deposits on the surfaces 12 of the blades 7 under temperature conditions of less than 0° C., as shown in FIG. 4.

Preferably, the ice 13 deposits on portion 26 of surface 12, in particular on the leading edges 40 of the blades 7.

Operation of the helicopter 1 is described hereinafter with reference to an individual blade 7 and to the relative de-icing system 10.

If the sensor 50 detects the presence of ice 13, the control unit 51 trigger activation of layer 21 of the de-icing system 10.

This activation causes the circulation of electric current in the resistances forming layer 21 and the consequent generation of heat in layer 20.

This generation of heat causes the movement of layer 20 to the deformed configuration of FIG. 5, since the material of layer 20 alters its shape according to the temperature to which it is exposed.

As shown in FIG. 5, the movement of layer 20 to the deformed configuration causes layer 25 to move away from the body 11 of the blade 7 until it reaches the first position.

Due to its properties of mechanical flexibility, layer 25 maintains contact with the crests 22 of layer 20 and consequently exerts a mechanical action on the ice 13.

This mechanical action causes fragmentation of the ice 13 and detachment of the ice 13 from the blades 7.

Once the atmospheric conditions under which the ice 13 forms cease, the sensor 50 ceases to detect the presence of ice 13.

The control unit 51 deactivates layer 21 of the de-icing system 10.

In consequence, the electric current ceases to circulate in layer 21, layer 20 returns to the undeformed configuration and layer 25 returns to the second position of FIG. 4.

During all the aforementioned operations, layer 25 protects the particularly delicate layer 20 from impacts against atmospheric agents, dust and sand.

This protective action is particularly relevant:
at the ends 18 of the blades 7, where the tangential velocities and, in consequence, the intensity of any impact is greater; and/or
when the helicopter 1 is in low-altitude hovering flight conditions or on the ground with the rotors 3 in operation, thereby heightening the risk of solid residues on the ground being entrained and striking the blades 7.

From examination of the characteristics of the blade 7 and the method provided according to the present invention, the advantages that can be achieved therewith are evident.

In particular, the de-icing system 10 of each blade 7 comprises a layer 25 laid on top of layer 20 and defining the portion 26 on which ice 13 deposits.

In this way, layer 25 protects layer 20 from impacts with any debris in the air and atmospheric agents. In this way, the risk of damaging the layer 20 is substantially reduced and a long operating life for the de-icing system 10 is ensured, with evident advantages regarding the safety of the helicopter 1.

Layer 25 is made of a super-plastic material, which is:
sufficiently rigid to resist the impacts against external agents, for example sand or dust at the tangential velocity of the blades 7, and with particular reference to a low-altitude, close-to-ground flight condition of the helicopter 1 or a condition in which the helicopter 1 is on the ground with the rotors 3 and 5 in operation; and
sufficiently flexible to elastically move between the aforementioned first and second configurations, following the movements of layer 20 between the respective undeformed and deformed configurations.

As it is made of a material with elastic deformation of up to 0.5%, layer 21 is able to elastically move between the first and second positions, following the movement of layer 21.

As these values of maximum deformation in the elastic stage are maintained in a variable temperature range between −40° C. and 70° C. and/or for a number of fatigue cycles exceeding a million, layer 25 enables protecting layer 20 over a wide range of operating temperatures for the helicopter 1 and for a period of time of the same order of magnitude as the useful life of the helicopter 1.

Layer 25 is arranged over the leading edge 40, where the risk of impact and damage to layer 20 is greater. In this way, the effectiveness of the protective action of layer 25 is increased.

Finally, it is clear that modifications and variants can be made regarding the blade 7 and the method claimed without departing from the scope of the present invention.

In particular, both the blades 7 of the rotor 3 and the blades 14 of the tail rotor 5 could be provided with respective de-icing systems 10.

Furthermore, the aircraft could be a convertiplane, with one or more rotors that rotate from a horizontal position (helicopter mode) to a vertical position (aeroplane mode).

The invention claimed is:

1. A blade for a rotor of a hover-capable aircraft, comprising:
   a main body delimited by a main body surface; and
   a de-icing system for removing ice;
   said de-icing system, comprising:
      a first layer formed by a shape-memory material activatable so as to alter its shape according to a temperature-associable quantity, which is arranged on the main body surface; and
      an activation layer, which is adapted to be selectively activatable to generate an amount of heat necessary to activate said first layer;
   said activation layer being embedded in said main body in a position adjacent to said first layer so that heat generated by the activation layer raises a temperature of said first layer and activates, the first layer;
   said de-icing system comprising: a second layer, which defines a portion of an outer surface of said blade on which, said ice deposits;
   said second layer being laid on top of said first layer on a side opposite said main body, being selectively movable under an action of said first layer so as to exert a mechanical action on said ice and remove said ice from said blade, and being adapted to protect said first layer from external agents;
   said second layer being elastically movable between:
      a first position assumed when said first layer is activated, where said first layer is at least partly moved away from said main body, so as to remove said ice; and
      a second position assumed when said first layer is, deactivated, where said first layer is at least partly in a position closer to said main body with respect to said first position;
   wherein said first layer is applied directly to a first region of said main body surface;
   said second layer being applied directly to a second region of said main body surface separate from said first region:
   said second layer adhering, to said first layer for an entire extension of said first layer in said second position.

2. The blade of claim 1, wherein said first layer assumes, a first undeformed configuration when it is below a temperature threshold value, and assumes, a second deformed configuration when it is above said temperature threshold value;
   said first layer assuming, in said first undeformed configuration, the same shape as said main body surface;
   said first layer assuming, in said second deformed configuration, an undulated configuration formed by an alternated plurality of crests and troughs;
   said crests being spaced apart from said surface and protruding towards said outer surface, so as to exert, an action on said ice causing ice fragmentation, in said deformed configuration;
   said troughs adhering, to said main body surface, in said deformed configuration;
   said second layer adhering to said crests and being spaced apart from said main body surface, in said first position.

3. The blade according to claim 1, wherein said second layer is made of a super-plastic material.

4. The blade according to claim 1, wherein said second layer is made of a material having a maximum deformation under load of 0.5% in the elastic stage.

5. The blade according to claim 4, wherein said second layer exhibits said deformation under load of 0.5% in a temperature range varying between −40° C. and +70° C.

6. The blade according to claim 4, wherein said second layer is made of one of a metal material and a non-metal material.

7. The blade according to claim 6, wherein the metal material comprises a titanium alloy.

8. The blade according to claim 6, wherein said second layer is glued on said second region.

9. The blade according to claim 1, further comprising:
   a leading edge;
   a trailing edged, which interacts with an airflow after said leading edge; and
   a top surface and an underside opposite to each other and extending between said leading edge and said trailing edge;
   said second layer extending over said leading edge and portions of said top surface adjacent to said leading edge and converging on said leading edge.

10. The blade according to claim 9, wherein said first region is arranged radially external with respect to said second region in relation to a rotation axis of said blade;
   said first region extends over said leading edge and said portions of said top surface and said underside incident with each other on said leading edge; and
   said second region extends over the region of said top surface and said underside spaced out from said leading edge.

11. The blade according to claim 1, further comprising:
   a root portion hingeable on said rotor;
   a free end; and
   a main portion interposed between said root portion and said free end, proceeding along a direction of extension of said blade;
   said second layer extending over said free end and said main portion.

12. A rotor for a hover-capable aircraft comprising:
   a hub; and
   at least one blade according to claim 1.

13. A hover-capable aircraft, comprising at least one rotor incorporating the blade according to claim 1.

14. The blade according to claim 1, wherein the second layer is applied directly on a portion of the main body by means of two glued areas arranged respectively on a top surface and an underside of the blade, and
   the first layer is separated from the two glued areas by respective grooves arranged on the top surface and the underside of the blade.

15. A method for removing ice from a blade of a rotor of a hover-capable aircraft;
   said method comprising the steps of:
      i) changing a shape of a shape-memory material according to a temperature-associated quantity, said shape-memory material forming a first layer of said blade arranged on at least one main body surface delimiting a main body of said blade;
      ii) selectively moving a second layer of said blade under an action of said first layer so as to exert a mechanical action on said ice and remove said ice from at least a portion of an outer surface of said blade, said second layer being laid on top of said first layer on a side opposite said main body;

iii) protecting said first layer from external agents by means of said second layer;

iv) selectively activating an activation layer to generate an amount of heat necessary to activate said first layer, said activation layer being embedded in said main body in a position adjacent to said first layer so that the heat it generated by the activation layer raises a temperature of said first layer and activates said first layer;

v) elastically moving said second layer between:
- a first position assumed when said first layer is activated, where said first layer is at least partly moved away from said main body, so as to remove said ice; and
- a second position assumed when said first layer is deactivated, where said first layer is at least partly in a position closer to said main body with respect to said first position;

wherein said first layer is applied directly to a first region of said main body surface;

said second layer being applied directly to a second region of said main body surface separate from said first region;

said second layer adhering, to said first layer for an entire extension of said first layer in said second position.

16. The method of claim 15, further comprising the step vi) of setting said first layer in a first undeformed configuration when it is below a temperature threshold value, and in a second deformed configuration when it is above said temperature threshold value;

said first layer assuming, in said first undeformed configuration, the same shape as said main body surface;

said first layer assuming, in said second deformed configuration, an undulated configuration formed by an alternated plurality of crests and troughs;

said crests being spaced apart from said surface and protruding towards said outer surface, so as to exert, an action on said ice causing ice fragmentation, in said deformed configuration;

said throughs adhering, to said surface, in said deformed configuration; and said second layer adhering to said crests and being spaced apart from said surface, in said first position.

17. The method of claim 15, wherein the second layer is applied directly on a portion of the main body by means of two glued areas arranged respectively on a top surface and an underside of the blade, and the first layer is separated from the two glued areas by respective grooves arranged on the top surface and the underside of the blade.

* * * * *